United States Patent [19]
Kim

[11] Patent Number: 5,953,131
[45] Date of Patent: Sep. 14, 1999

[54] METHOD FOR RELAYING FACSIMILE MESSAGE BY REMOTE CONTROL

[75] Inventor: Sung-Hyun Kim, Gumi, Rep. of Korea

[73] Assignee: Samsung Electronics Co., Ltd., Suwon, Rep. of Korea

[21] Appl. No.: 08/785,632

[22] Filed: Jan. 17, 1997

[30] Foreign Application Priority Data

Jan. 19, 1996 [KR] Rep. of Korea .................. 96/1173

[51] Int. Cl.⁶ .................................................. H04N 1/00
[52] U.S. Cl. ........................... 358/407; 358/400; 358/402
[58] Field of Search ............................ 358/405–407, 358/439–440, 400, 402, 403, 468, 441–443; 379/102.02, 88.24, 100.09, 93.01

[56] References Cited

U.S. PATENT DOCUMENTS

| | | | |
|---|---|---|---|
| 4,586,086 | 4/1986 | Ohzeki ................................ | 358/405 |
| 4,642,697 | 2/1987 | Wada ................................. | 358/439 |
| 5,216,706 | 6/1993 | Nakajima .......................... | 379/102.02 |
| 5,237,428 | 8/1993 | Tajitsu et al. ..................... | 358/440 |
| 5,291,546 | 3/1994 | Giler et al. ....................... | 379/93.1 |
| 5,367,564 | 11/1994 | Sutoh et al. ..................... | 379/100.09 |
| 5,384,830 | 1/1995 | Ide .................................. | 379/88.24 |
| 5,392,131 | 2/1995 | Umeno ............................. | 358/403 |
| 5,481,373 | 1/1996 | Ikeguchi et al. ................. | 358/434 |
| 5,488,651 | 1/1996 | Giler et al. ....................... | 358/402 |
| 5,499,109 | 3/1996 | Mathur et al. ................... | 358/400 |
| 5,523,854 | 6/1996 | Hornsby .......................... | 358/407 |
| 5,555,100 | 9/1996 | Bloomfield et al. ............. | 358/402 |

FOREIGN PATENT DOCUMENTS

| | | | |
|---|---|---|---|
| 2 303 520 | 2/1997 | United Kingdom ............ | H04N 1/32 |
| WO 91/03115 | 3/1991 | WIPO ............................. | H04M 1/32 |

Primary Examiner—Jose L. Couso
Assistant Examiner—Ishrat Sherali
Attorney, Agent, or Firm—Robert E. Bushnell, Esq.

[57] ABSTRACT

A method for operating a facsimile machine enables a user to remotely register an appointed time and an appointed telephone number within a first memory of the facsimile machine. After the appointed time and telephone number are registered, the facsimile machine receives a facsimile message from a remote facsimile transmission source, and stores the facsimile message within a second memory of the facsimile machine. At the appointed time, the facsimile machine automatically dials the appointed telephone number, and transmits the facsimile message to a remote facsimile receiving source corresponding to the appointed telephone number.

17 Claims, 5 Drawing Sheets

| PASSWORD | 4 BYTE |
| --- | --- |
| APPOINTED TIME | 4 BYTE |
| APPOINTED PHONE NUMBER | 20 BYTE |
| STORAGE ADDRESS | 4 BYTE |

*Fig. 4A*

| STORAGE ADDRESS | FACSIMILE DATA |
| --- | --- |
| o o o o | |
| o o o o | |
| . . . | . . . |

*Fig. 4B*

METHOD FOR RELAYING FACSIMILE MESSAGE BY REMOTE CONTROL

CROSS-REFERENCE TO RELATED APPLICATIONS

This application makes reference to, incorporates the same herein, and claims all benefits accruing under 35 U.S.C. §119 arising from an application for *Method For Relaying Facsimile Message By Remote Control* earlier filed in the Korean Industrial Property Office on Jan. 19, 1996 and there duly assigned Serial No. 1173/1996.

BACKGROUND OF THE INVENTION

The present invention relates to a facsimile machine, and more particularly, to a method that enables a user to remotely register an appointed time and telephone number within the facsimile machine. The facsimile machine automatically dials the appointed telephone number at the appointed time, and transmits a stored facsimile message.

A conventional facsimile machine provides a function of automatically receiving a facsimile message in response to an incoming call during a user's absence, so that the user may obtain the received facsimile message upon return. Further, if the facsimile machine has an automatic answering function, a communication channel is automatically established when an incoming call is received, and an outgoing message (OGM) recorded in the facsimile machine is transmitted to a calling party.

In addition to these functions, conventional facsimile machines offer users with a host of other useful functions. For example, U.S. Pat. No. 5,384,830 entitled *Apparatus With Selective Forwarding Of Facsimile And Voice Communications* issued to Ide notifies a user of the details of image signal storing contents without restricting the selection of a transfer destination. In Ide '830, an image signal memory stores image signals, and a list text creation section creates an image storing content list, a tabulated listing of the stored image signals. A list text transfer section transmits the image storing content list created by the list text creation section to a designated image list transfer destination number stored in a transfer destination terminal number memory. While conventional art, such as Ide '830, provides benefits in its own right, I believe that additional functions for a facsimile machine can be contemplated.

SUMMARY OF THE INVENTION

It is an object of the present invention to provide a facsimile machine and method for automatically transmitting a facsimile message to an appointed telephone number at an appointed time.

It is another object to provide a facsimile machine and method for enabling a user from a remote location to register an appointed time and telephone number within the facsimile machine via a telephone connected to the facsimile machine through a telephonic communication channel.

It is still another object to provide a facsimile machine and method that automatically provides a user with a stored facsimile message at a time designated by the user.

It is yet another object to provide a method that enables a user to optimally utilize a facsimile machine.

These and other objects can be achieved in accordance with the principles of the present invention with a method for operating a facsimile machine that enables a user to register an appointed time and an appointed telephone number within a first memory of the facsimile machine. During this registration, the user is positioned at a remote location having a dual tone multi-frequency (DTMF) signal generating source connected to the facsimile machine via a telephonic communication channel. After the registration, the facsimile machine receives a facsimile message from a remote facsimile transmission source, and stores the facsimile message within a second memory of the facsimile machine. At the appointed time, the facsimile machine automatically dials the appointed telephone number, and transmits the facsimile message to a remote facsimile receiving source corresponding to the appointed telephone number.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIGS. 4A and 4B are tables illustrating the structure of a memory constructed according to the principles of the present invention.

DETAILED DESCRIPTION OF THE INVENTION

Figure 1:
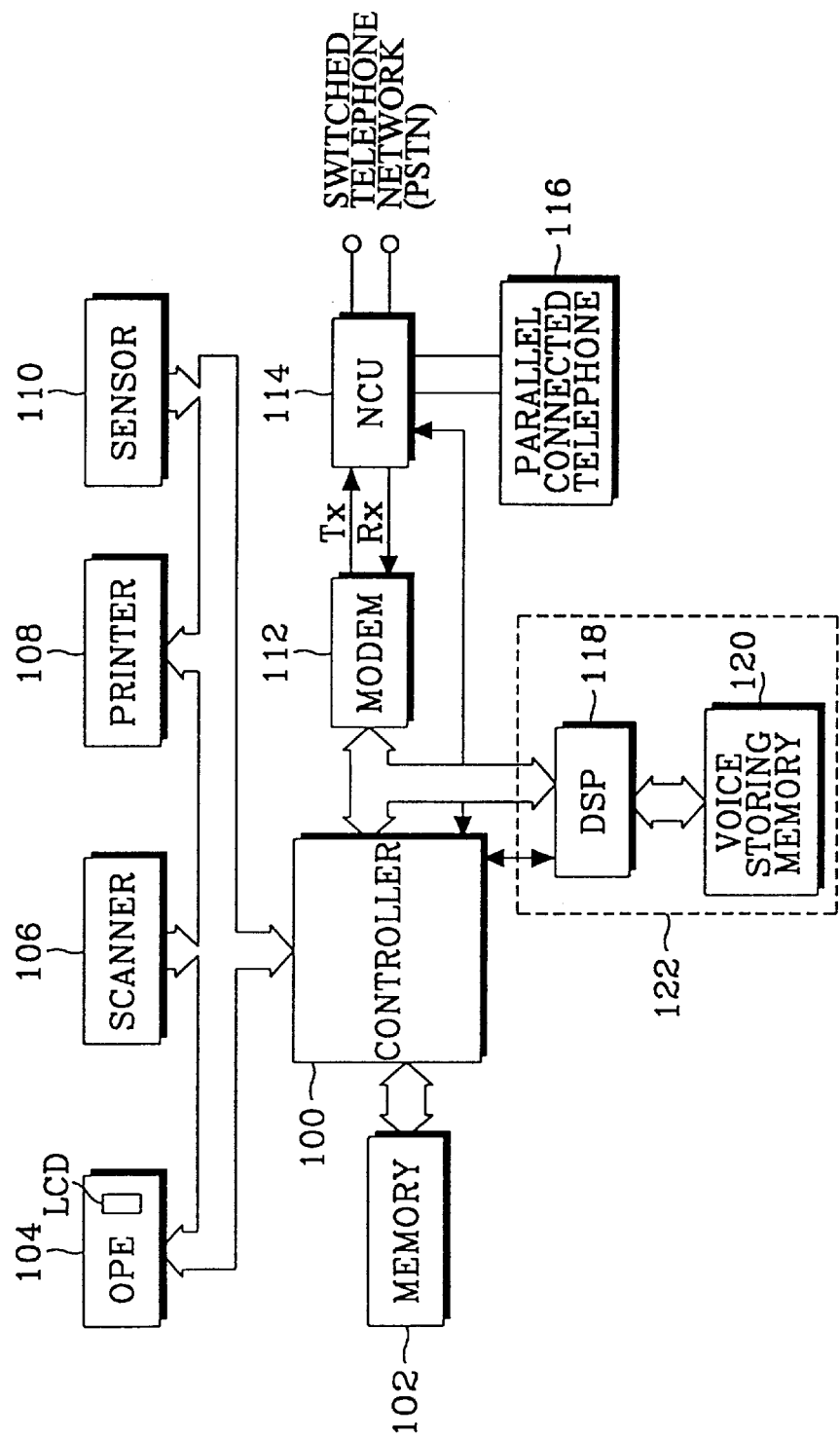
FIG. 1 is a block diagram of a facsimile machine constructed according to the principles of the present invention.

Turning now to the drawings and referring to FIG. 1, a block diagram of a facsimile machine constructed according to the principles of the present invention is shown. In FIG. 1, a controller 100 (e.g., microprocessor) controls the facsimile machine according to programs of preset modes, and temporarily stores an appointed time and telephone number in an internal memory. Controller 100 also includes a built-in timer. A memory 102 temporarily stores and outputs received facsimile data under the control of controller 100. An operating panel (OPE) 104 provides a key matrix including a plurality of function keys for setting various functions, and a plurality of numeric keys for supplying key data produced by keying operations to controller 100. Operating panel (OPE) 104 is also provided with a liquid crystal display (LCD) for displaying the current operational state of the facsimile machine under the control of controller 100.

When a sending or duplicating mode is set, a scanner 106 scans a document to generate image data that is transferred to controller 100. A printer 108 prints received facsimile data or duplicating data. A sensor 110 detects the operational state of every component of the facsimile machine, and provides the detected results to controller 100. A modem 112 demodulates analog signals received from a network control unit (NCU) 114 to generate digital signals, and modulates digital signals received from controller 100 to generate analog signals. Network control unit (NCU) 114 forms a communication path between a public switched telephone network (PSTN) and modem 112.

A parallel connected telephone 116 is connected to the facsimile machine through the network control unit (NCU) 114 and performs voice communication. An automatic answering device 122 including a digital signal processor (DSP) 118, a coder/decoder (CODEC) and a voice (i.e., audio data) storing memory 120, controls output of an outgoing message (OGM). The digital signal processor (DSP) 118 converts digital signals to numeric data for storage in the voice storing memory 120.

Figure 2A:
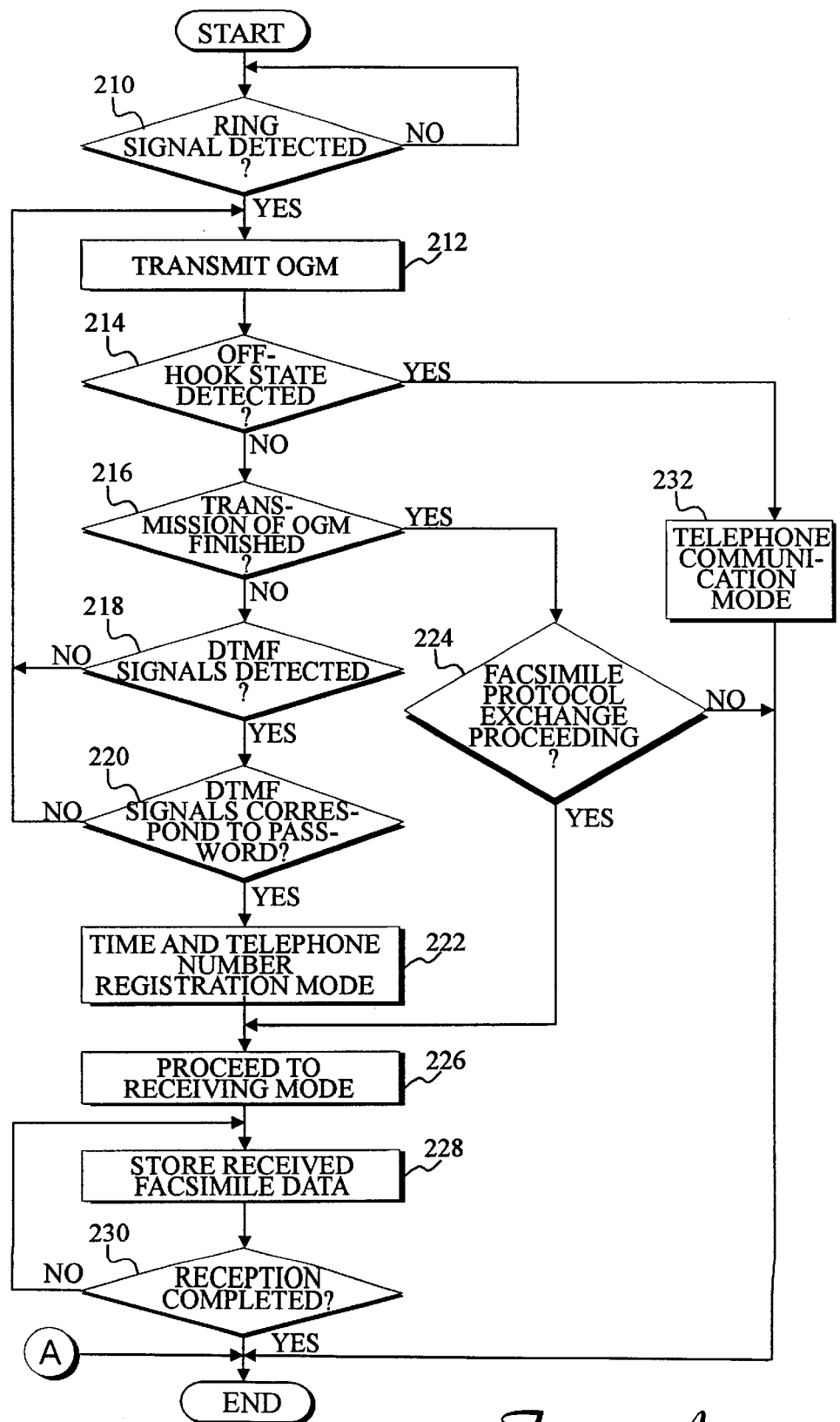
FIGS. 2A and 2B are flow charts of steps for executing a registration mode with the facsimile machine constructed according to the principles of the present invention.
Figure 2B:
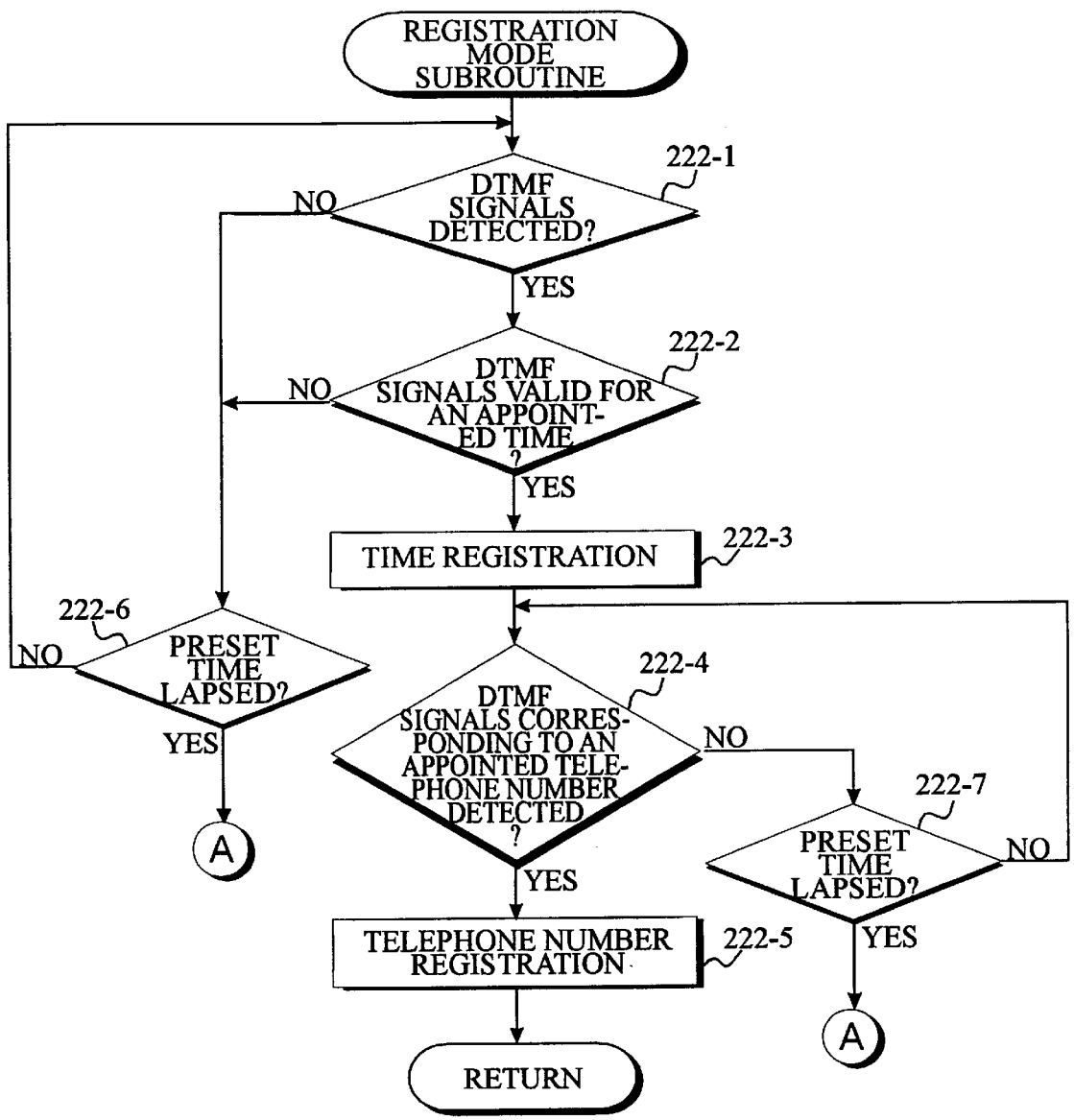

Referring to FIG. 2A, a flow chart of the steps for executing a registration mode with the facsimile machine constructed according to the principles of the present invention is shown. Briefly, FIG. 2A includes the steps of: transmitting an outgoing message (OGM) upon detection of a ring signal, executing a telephone coimmunication mode when a receiver (i.e., handset) is switched to an off-hook state, determining whether or not dual tone multi-frequency (DTMF) signals received in response to the outgoing message (OGM) correspond to a predetermined password, executing a registration mode to register an appointed time and telephone number when the dual tone multi-frequency (DTMF) signals correspond to the predetermined password, executing a receiving mode after terminating the registration mode, and storing received facsimile data during the receiving mode. FIG. 2B illustrates the specific steps for registering the appointed time and telephone number. The appointed time and telephone number are registered using dual tone multi-frequency (DTMF) signals.

Figure 3:
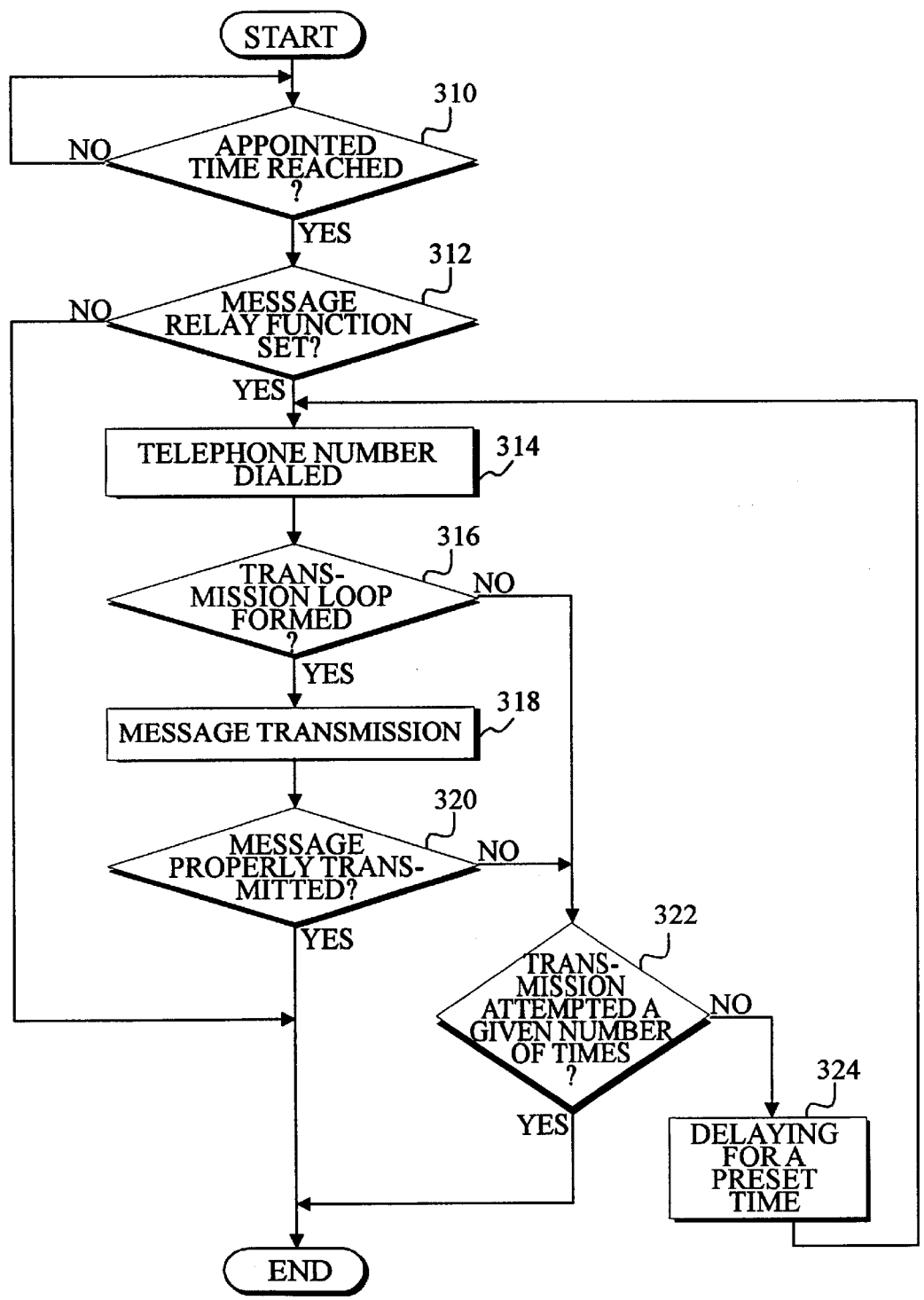
FIG. 3 is a flow chart of steps for relaying a facsimile message at an appointed time from the facsimile machine constructed according to the principles of the present invention.

Referring to FIG. 3, a flow chart of steps for relaying a facsimile message at an appointed time from the facsimile machine constructed according to the principles of the present invention is shown. Briefly, FIG. 3 includes the steps of determining whether or not a message relay function is set at the appointed time, dialing the appointed telephone number when the message relay function is set, transmitting the facsimile message stored in memory to a facsimile machine corresponding to the appointed telephone number, determining whether or not the facsimile message has been properly transmitted, and repeating transmission of the facsimile message up to a given number of times when the facsimile message has not been properly transmitted.

FIG. 4A illustrates the structure of the internal memory of controller 100, and FIG. 4B illustrates the structure of memory 102 for storing facsimile data.

The operation of the present invention will now be provided with reference to FIGS. 1 through 3.

In step 210, controller 100 determines whether or not a ring signal is detected from network control unit (NCU) 114. Controller 100 establishes a communication channel upon detecting an incoming ring signal. In step 212, digital signal processor (DSP) 118 reproduces the outgoing message (OGM) stored in memory 120 for transmission via the communication channel. Then, in step 214, controller 100 detects whether or not the handset of the parallel connected telephone 116 is switched to an off-hook state. When controller 100 detects the off-hook state, a telephone communication mode is executed, in step 232. When the off-hook state is not detected, controller 100 determines whether or not transmission of the outgoing message (OGM) is finished, in step 216. When transmission of the outgoing message (OGM) is finished, controller 100 determines whether or not a facsimile protocol exchange is proceeding, in step 224. When the facsimile protocol exchange is proceeding, the receiving mode is executed, in step 226.

Referring back to step 216, when transmission of the outgoing message (OGM) is not finished, controller 100 determines whether or not dual tone multi-frequency (DTMF) signals are detected, in step 218. These dual tone multi-frequency (DTMF) signals are entered by a user from a remote location via a telephone (or any other DTMF signal generating source) connected to the facsimile machine through the public switched telephone network (PSTN). When dual tone multi-frequency (DTMF) signals are detected, the dual tone multi-frequency (DTMF) signals are compared with a predetermined password stored in the internal memory of controller 100 to determine whether or not the dual tone multi-frequency (DTMF) signals correspond to the predetermined password. When the dual tone multi-frequency (DTMF) signals do not correspond to the predetermined password, logical flow returns to step 212. Alternatively, when the dual tone multi-frequency (DTMF) signals correspond to the predetermined password, a time and telephone number registration mode is executed, in step 222. The details of step 222, which are shown in FIG. 2B, will now be discussed with reference to FIG. 2B.

In step 222-1, controller 100 determines whether or not dual tone multi-frequency (DTMF) signals are detected. After dual tone multi-frequency (DTMF) signals are detected, controller 100 determines whether or not the dual tone multi-frequency (DTMF) signals correctly represent, or are valid for, an appointed time, in step 222-2. When the dual tone multi-frequency (DTMF) signals do not correctly represent an appointed time, controller 100 determines whether or not a preset time has elapsed, in step 222-6. If the preset time has not elapsed, logical flow returns to step 222-1. If the preset time has elapsed, the process ends.

When the dual tone multi-frequency (DTMF) signals are valid for an appointed time in step 222-2, controller 100 advances to step 222-3 and registers the appointed time in the corresponding data region of its internal memory, as shown in FIG. 4A. Then, in step 222-4, controller 100 determines whether or not dual tone multi-frequency (DTMF) signals corresponding to an appointed telephone number are detected. When dual tone multi-frequency (DTMF) signals corresponding to an appointed telephone number are not detected, controller 100 determines whether or not a preset time has elapsed, in step 222-7. If the preset time has not elapsed, logical flow returns to step 222-4. If the preset time has elapsed, the process ends. When dual tone multi-frequency (DTMF) signals corresponding to an appointed telephone number are detected in step 222-4, controller 100 registers the appointed telephone number in the corresponding data region of its internal memory, as shown in FIG. 4A.

After the time and telephone number registration mode of FIG. 2B is finished, controller 100 proceeds to the receiving mode, in step 226 of FIG. 2A. The receiving mode enables the facsimile machine to receive and store facsimile data. Next, in step 228, facsimile data received through the network control unit (NCU) 114 and modem 112 is stored in a specified storage address of memory 102, as shown in FIG. 4B.

FIG. 3 is a flow chart of steps for relaying the stored facsimile data at the appointed time in accordance with the principles of the present invention. In step 310, controller 100 determines whether or not the appointed time has been reached. That is, controller 100 determines whether or not the current time equals the appointed time. When the appointed time has been reached, controller 100 determines whether or not a message relay function of the facsimile machine is set, in step 312. If the message relay function is set, controller 100 proceeds to step 314, where the network control unit (NCU) 114 and modem 112 are controlled to dial the appointed telephone number retrieved from the internal memory of controller 100. After the appointed telephone number is dialed, controller 100 determines whether or not a transmission loop is formed, in step 316. When the transmission loop is formed, controller 100 retrieves the stored facsimile data from memory 102, and enables conversion of the facsimile data from the digital format of FIG. 4B to an analog format by means of modem 112. The facsimile data representative of a given facsimile message is then transmitted through network control unit (NCU) 114 to public switched telephone network (PSTN), in step 318.

Thereafter, in step 320, controller 100 receives a tone signal from modem 112 to determine whether or not the facsimile message is properly (i.e., normally) transmitted. If a busy tone is detected indicating that the facsimile message is not properly transmitted, or if the transmission loop is not formed in step 316, controller 100 proceeds to step 322. In step 322, controller 100 determines whether or not facsimile transmission has been attempted a given (i.e., predetermined) number of times. That is, controller 100 determines whether or not the appointed telephone number has been dialed a predetermined number of times. When the appointed telephone number has not been dialed a given number of times, controller 100 proceeds to step 324 and delays for a preset time period. After the preset time period has lapsed, controller 100 proceeds back to step 314. Alternatively, when the appointed telephone number has been dialed a given number of times, in step 322, or the facsimile message has been properly transmitted, in step 320, the process ends.

According to the principles of the present invention, an appointed telephone number and an appointed time are registered in a facsimile machine by a user at a remote location via a telephone. Thereafter, a facsimile message stored in the facsimile machine is automatically transmitted to the appointed telephone number at the appointed time. Hence, the user can control his facsimile machine from a remote location to send the facsimile message at a desired time.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for operating a facsimile machine, comprising the steps of:

transmitting an outgoing message to a user when an incoming ring signal from the user is detected;

receiving signals from the user while said outgoing message is being transmitted, and determining whether said signals correspond to a predetermined password stored in said facsimile machine;

enabling the user to register an appointed time and an appointed telephone number within a first memory of said facsimile machine when said signals are determined to correspond to said predetermined password, the user being positioned at a remote location having a signal generating source connected to said facsimile machine via a telephonic communication channel;

receiving a facsimile message from a remote facsimile transmission source after registration of the appointed time and telephone number by the user, and storing said facsimile message within a second memory of said facsimile machine;

automatically dialing said appointed telephone number at said appointed time; and transmitting said facsimile message to a remote facsimile receiving source corresponding to said appointed telephone number.

2. The method as claimed in claim 1, wherein said signal generating source generates dual tone multi-frequency signals.

3. The method as claimed in claim 1, further comprising the step of determining whether or not said facsimile message has been properly transmitted to said remote facsimile receiving source corresponding to said appointed telephone number.

4. The method as claimed in claim 3, further comprising the step of attempting to transmit said facsimile message to said remote facsimile receiving source corresponding to said appointed telephone number up to a predetermined number of times when said facsimile message has not been properly transmitted.

5. The method as claimed in claim 1, wherein said appointed telephone number is automatically dialed only when a message relay function of said facsimile machine is set.

6. The method as claimed in claim 2, wherein said appointed telephone number is automatically dialed only when a message relay function of said facsimile machine is set.

7. The method as claimed in claim 4, wherein said appointed telephone number is automatically dialed only when a message relay function of said facsimile machine is set.

8. A method for operating a facsimile machine, comprising the steps of:

transmitting an outgoing message to a user when an incoming ring signal from the user is detected;

receiving dual tone multi-frequency signals from the user while said outgoing message is being transmitted, and determining whether or not said dual tone multi-frequency signals correspond to a predetermined password stored within said facsimile machine;

storing an appointed time and an appointed telephone number entered by the user within said facsimile machine when said dual tone multi-frequency signals correspond to said predetermined password;

establishing a receiving mode of said facsimile machine after said appointed time and said appointed telephone number are entered by the user and stored;

receiving a facsimile message from a remote facsimile transmission source during said receiving mode, and storing said facsimile message within said facsimile machine;

determining when a current time corresponds to said appointed time;

establishing a communication channel by automatically dialing said appointed telephone number when said current time corresponds to said appointed time; and transmitting said facsimile message to a remote facsimile receiving source corresponding to said appointed telephone number through said communication channel.

9. The method as claimed in claim 8, further comprising the step of determining whether or not said facsimile message has been properly transmitted to said remote facsimile receiving source corresponding to said appointed telephone number.

10. The method as claimed in claim 9, further comprising the step of attempting to transmit said facsimile message to said remote facsimile receiving source corresponding to said appointed telephone number up to a predetermined number of times when said facsimile message has not been properly transmitted.

11. The method as claimed in claim 8, wherein said appointed telephone number is automatically dialed only when a message relay function of said facsimile machine is set.

12. A facsimile machine, comprising:

means for detecting an incoming ring signal from a user positioned at a remote location and having a signal generating soure connected to said facsimile machine via a telephone network;

means for transmitting an outgoing message to said user when said incoming ring signal is detected;

means for receiving an appointed time and an appointed telephone number from the user;

a controller for storing the appointed time and the appointed telephone number received from the user positioned at the remote location; and a memory for receiving and storing a facsimile message provided from a remote facsimile transmission source connected to said facsimile machine via said telephonic communication network after receipt and storage of the appointed time and telephone number from the user;

said controller causing said appointed telephone number to be dialed at said appointed time, and enabling transmission of said facsimile message to a remote facsimile receiving source corresponding to said appointed telephone number via said telephone network.

13. The facsimile machine as claimed in claim 12, wherein said signal generating source generates dual tone multi-frequency signals.

14. The facsimile machine as claimed in claim 12, wherein said controller determines whether or not said facsimile message has been properly transmitted to said remote facsimile receiving source corresponding to said appointed telephone number.

15. The facsimile machine as claimed in claim 14, wherein said controller enables transmission of said facsimile message to said remote facsimile receiving source corresponding to said appointed telephone number up to a predetermined number of times when said facsimile message has not been properly transmitted.

16. The facsimile machine as claimed in claim 12, wherein said controller causes said appointed telephone number to be dialed at said appointed time only when a message relay function of said facsimile machine is set.

17. The facsimile machine as claimed in claim 15, wherein said controller causes said appointed telephone number to be dialed at said appointed time only when a message relay function of said facsimile machine is set.

* * * * *